Aug. 22, 1967
JAMES E. WEBB
3,337,315
ADMINISTRATOR OF THE NATIONAL AERONAUTICS
AND SPACE ADMINISTRATION
METHOD FOR FIBERIZING CERAMIC MATERIALS
Filed Nov. 10, 1964
Fig. 1
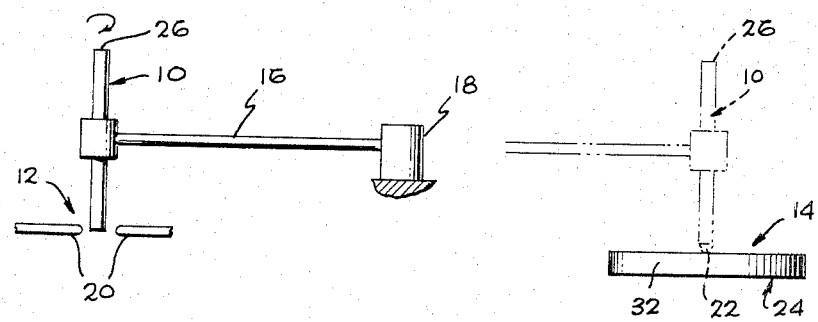
Fig. 2
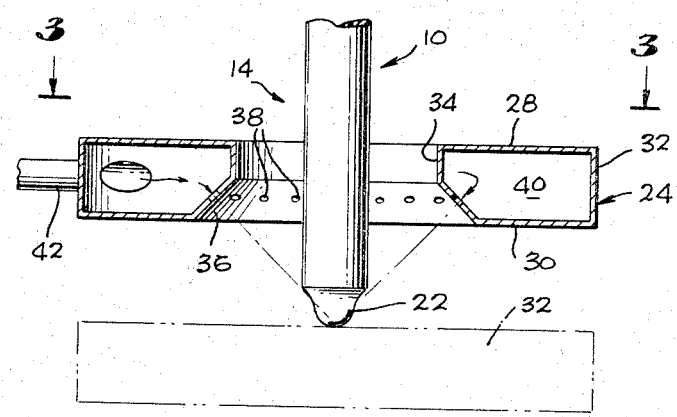
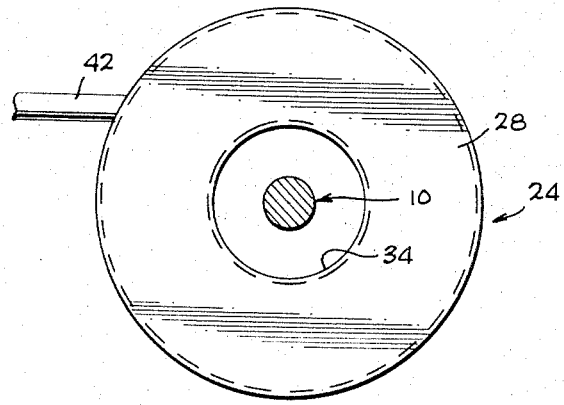
Fig. 3
LOUIS E. GATES, JR.
WILLIAM E. LENT
INVENTORS
BY *P. H. McCay*
*Monte F. Mott*
ATTORNEYS

United States Patent Office 3,337,315
Patented Aug. 22, 1967

3,337,315
METHOD FOR FIBERIZING CERAMIC MATERIALS
James E. Webb, Administrator of the National Aeronautics and Space Administration, with respect to an invention of Louis E. Gates, Jr., Inglewood, and William E. Lent, Los Angeles, Calif.
Filed Nov. 10, 1964, Ser. No. 410,325
5 Claims. (Cl. 65—7)

The invention described herein was made in the performance of work under a NASA contract and is subject to provisions of Section 305 of the National Aeronautics and Space Act of 1958, Public Law 85–568 (72 Stat. 435; 42 USC 2457).

This invention relates to a process for fiberizing ceramic materials, and it further relates to materials suitable for fiberizing.

With the increasing need both in industry and government for ceramic materials having relatively high fusion temperatures and tensile strengths, the effort to obtain such materials and a process to fiberize the same has increased. For instance, heat resistant types of materials which will provide adequate protection to individuals and critical aerospace components are in considerable demand in the aerospace industry. Individuals working in heat hazardous areas need adequate protective clothing, and mechanical components, proximate to the high temperature zones of rocket engines, need to be fabricated of heat resistant materials.

In the absence of suitable materials these components are destroyed or subject to destruction which may very well result in aborting and delaying a program until the damage is repaired.

The aforementioned increased effort has produced the hereinafter described process and materials.

The instant invention comprises, generally, a five-step process for fiberizing ceramic materials having relatively high fusion temperatures and tensile strengths. The five steps are:

(1) Rotating a substantially vertically disposed ceramic rod while heating one end thereof at a sufficiently high and precisely controlled temperature to achieve obtaining a uniformly homogeneous molten droplet on the heated end thereof;

(2) Moving said rod to a position above an annular ring nozzle;

(3) At which time rotation of the rod ceases;

(4) Moving an annular ring nozzle and the ceramic rod relative to each other whereby the ring nozzle surrounds the heated end of the rod; and (5) Fiberizing the droplet by blasting it with, generally, inclined downwardly and precisely directed jets of high pressure gas, there being a predetermined delay or dwell time between steps (1) and (5) to achieve optimum viscosity of the material.

The ceramic materials, suitable to be fiberized by the foregoing process, are uniquely formulated to provide for relatively high fusion temperatures and tensile strengths. When properly treated by the process, the materials provide a relatively high yield of glass fibers which may be converted into fabrics or rigid structural components which are remarkably resistant to heat.

The prior art fails to teach two or more of the aforementioned process steps. A typical example of a process for fiberizing materials relies on the materials initially being in a liquid state, and in this condition the material is blasted by jets of gas. The likelihood of obtaining globules or unfiberized contaminants mixed with the glass fibers is excellent.

Another typical prior art example employs the horizontal process for fiberizing materials. A horizontally held ceramic rod is heated and simultaneously fiberized, there being no control of the ceramic viscosity. Since viscosity control is absent the material flows away from the blasting jets, or the viscosity is such as to preclude obtaining high yield.

Another example of prior art deficiency uses blasting jets of gas which are not precisely directed at the material, thereby resulting in reducing the fiber yield.

The prior art also fails to teach the use of temperatures required for melting refractory glasses together with the precise control over the temperature of molten material to achieve efficiency in converting the molten material into usable fibers.

The foregoing and other advantages of the process invention and materials employable therewith will become more apparent from a consideration which follows taken in conjunction with the drawings.

FIG. 1 is a schematic drawing illustrating the process for fiberizing ceramic materials;

FIG. 2 is an enlarged sectional view partially in elevation, illustrating, in solid lines, the position of the ceramic rod surrounded by an annular ring nozzle, and the location of the lower heated end of the rod with respect to the direction of flow of the bursts of gas jets; and FIG. 3 is a plan view, partially in section, taken on line 3—3 of FIG. 2.

*The process*

Referring to the schematic illustration of the process disclosed in FIG. 1, fiberizing of a heated portion of a ceramic rod 10 is accomplished in two zones, a heating zone, broadly designated 12, and a fiberizing zone, broadly designated 14. It is to be understood ceramic as used here may include glass, frit or other equally applicable materials.

Ceramic rod 10, while being rotated about its longitudinal axis, is held in a substantially vertical position. As illustrated in FIG. 1, the ceramic rod is held at the extreme free end of an arm 16 which rotates about a central vertical axis 18. However, several other means of holding rod 10 vertically is available, and the mode of holding rod 10 in FIG. 1 is not to be considered a limitation, but only an illustration having for its purpose the depicting of one possible means of achieving acceptable results.

With ceramic rod 10 held in the solid line position illustrated in FIG. 1, the lower end thereof is located between a pair of spaced carbon electrodes 20 which when energized produce sufficient heat to achieve melting of the lower end of the ceramic rod. The rotation of rod 10 together with the heating produces a relatively uniform homogenous molten droplet 22.

Although carbon electrodes 20 are illustrated as the means of heating rod 10 in heating zone 12, it is to be understood mercury type heat lamps may also be used as well as other types of devices which are applicable for achieving comparatively high temperatures.

When droplet 22 is formed, rod 10 is removed from zone 12 and transferred to fiberizing zone 14 where an annular ring nozzle 24 is raised from the dotted line position, illustrated in FIG. 2 to the solid line position in surrounding relationship to rod 10. Nozzle 24 is positioned between upper end 26 of rod 10 and droplet 22, and with nozzle 24 in surrounding relationship to rod 10 rotation of the rod ceases.

The position of ring nozzle 24 is comparatively critical in order to obtain maximum yield of fibers. The longitudinal axis of the ceramic rod should also comprise the major axis of a cone produced by inclined downwardly directed bursts of gas, to be hereinafter described in greater detail, with the apex of the cone occurring at the extreme free end of the molten droplet 22. In other words, the angle formed by the bursts of gas with respect to the longitudinal axis of the ceramic rod 10 is acute, and it has been found this acute angle should be between about 25° and 50° depending on the material being fiberized.

Ring nozzle 24 is, generally, rectangular in cross-section having a substantially horizontal upper wall 28, a substantially horizontal lower wall 30, and a substantially vertical outer wall 32, all of which are imperforate. The inner wall comprises two sections, a substantially vertical wall 34 and a declined wall 36, the former being imperforate and the latter having a multiplicity of perforations 38 therein from which bursts or jets of gas are, generally, downwardly discharged. The walls define a gas chamber 40 which is supplied by gas from supply line 42.

In order to achieve maximum yield of fibers, it is necessary the viscosity of the droplet 22 be optimum, and it has been determined a 0–5 second delay between forming of the droplet and fiberizing of the same will achieve the desired viscosity. The ceramic material of the rod determines the delay or lag time.

It has been determined that a burst of gas, pressurized to between about 250–350 pounds, the optimum pressure being substantially 300 pounds per square inch, will achieve optimum production of fibers. In other words, one burst per droplet 22 or 50 bursts per 50 droplets will achieve an optimum production of fibers. The fiber yield, for purposes of convenience, is reported as grams per 50 blasts.

A valve, not shown, upstream from supply line 42 may be automatically controlled to achieve the burst. The burst of gas and the duration depend largely on the material being fiberized and the effect of cooling on the droplet.

Each time rod 10 appended by a fresh molten droplet is surrounded by annular nozzle 24, the upstream valve is automatically actuated to release pressurized gas for producing fibers. The blast pressure and duration is to be adjusted according to the physical nature of the molten material to be fiberized. The composition of the material determines its viscosity and surface tension and the dependence of these two parameters upon time. The required cooling rate immediately after the fibers are formed is dependent upon the rate at which the fiber solidifies.

The gas employed may be air, steam or other gases inert to the ceramic material.

The burst of gas striking molten droplet 22 will produce fibers of the material which can then be collected and used to weave materials having the aforementioned physical properties. Rigid components having relatively high fusion temperatures and tensile strengths may be fabricated by combining the fibers with a suitable binder.

After the maximum yield of fibers is obtained from droplet 22 rod 10 may be returned to zone 12, and the process repeated. This procedure may be followed until ceramic rod 10 is totally consumed.

The material

A relatively large number of ceramic materials having relatively high fusion temperatures and tensile strengths have been produced and tested. It was determined those materials hereinafter listed in Table I met the requirements:

TABLE I

| | Composition | | Fiber Yield gm. per 50 Blasts | Fiber Fusion Temp., ° C. |
|---|---|---|---|---|
| | Material | Percent | | |
| 1 | $SiO_2$ | 36.00 | 6.6 | 1,475 |
| | $Al_2O_3$ | 48.00 | | |
| | $MgO$ | 16.00 | | |
| 2 | $SiO_2$ | 35.50 | 5.8 | 1,450 |
| | $Al_2O_3$ | 30.50 | | |
| | $MgO$ | 9.50 | | |
| | $ZrO_2$ | 24.50 | | |
| 3 | $SiO_2$ | 50.00 | 8.6 | 1,450 |
| | $Al_2O_3$ | 22.50 | | |
| | $MgO$ | 7.50 | | |
| | $ZrO_2$ | 20.00 | | |
| 4 | $SiO_2$ | 60.00 | 3.2 | 1,605 |
| | $Al_2O_3$ | 7.50 | | |
| | $MgO$ | 2.50 | | |
| | $ZrO_2$ | 30.00 | | |
| 5 | $SiO_2$ | 45.00 | 1.2 | 1,680 |
| | $ZrO_2$ | 45.00 | | |
| | $PbO$ | 10.00 | | |
| 6 | $SiO_2$ | 35.00 | 1.5 | 1,810 |
| | $Al_2O_3$ | 32.50 | | |
| | $ZnO$ | 32.50 | | |
| 7 | $SiO_2$ | 50.00 | 7.0 | 1,580 |
| | $Al_2O_3$ | 27.00 | | |
| | $MgO$ | 3.00 | | |
| | $ZrO_2$ | 20.00 | | |
| 8 | $SiO_2$ | 17.90 | 1.3 | 1,830 |
| | $Al_2O_3$ | 35.70 | | |
| | $ZnO$ | 35.70 | | |
| | $Sb_2O_3$ | 10.70 | | |
| 9 | $SiO_2$ | 60.00 | 3.4 | 1,575 |
| | $Al_2O_3$ | 10.00 | | |
| | $ZrO_2$ | 30.00 | | |
| 10 | $SiO_2$ | 58.20 | 2.2 | 1,575 |
| | $Al_2O_3$ | 7.28 | | |
| | $MgO$ | 2.42 | | |
| | $ZrO_2$ | 29.20 | | |
| | $Sa_2O_3$ | 2.90 | | |
| 11 | $Al_2O_3$ | 57.00 | 1.4 | 1,530 |
| | $CaF_2$ | 43.00 | | |

Although the table illustrates the optimum percentage of the compositions, it is to be understood the $SiO_2$ compound may vary between about 10–65%, $Al_2O_3$ may vary between about 0–75%, $MgO$, $ZrO_2$, $ZnO$, $Sb_2O_3$ and $PbO$ may vary between about 0–55%, and $CaF_2$ may vary between about 25–50%. In the event $PbO$ and $Al_2O_3$ are used together the total percentage limit is 0–8%.

The compositions of Examples 6 and 8 are known as modified zinc aluminum silicate glasses or ceramics, and the tensile strength is known to be as great as 1,065,000 pounds/square inch, the mean tensile strength being 331,350 pounds/square inch.

Example 5 discloses $SiO_2$ and $ZrO_2$ are used in equal amounts, and added to the two compounds is a relatively low percentage of $PbO$ which may be considered a glass modifier. The addition of the $PbO$ contributes to increasing the fiber yield.

The $Al_2O_3$ in Example 9 is employed for the purpose of lowering the viscosity of ceramic material when heated while at the same time contributing to the attainment of a high fiber yield.

The mean tensile strength of Examples 1, 3, 4, 7 and 10 has been determined to be 267,000 pounds/square inch, and the mean tensile strength of Example 11 has been determined to be 295,000 pounds/square inch.

$Al_2O_3$ is considered the glass former in Example 11 with $CaF_2$ acting as the modifier. One school of thought indicates the larger diameter of the fluoride anion is responsible for its ability to aid in glass network forming, believing it promotes a greater state of disorder which is responsible for glass formation.

In the case of Example 11 of the itemized list, it has been found the optimum molar ratio is 1:1.

In Examples 1, 3, 4 and 10 it has been determined best results may be achieved by maintaining the molar ratio of $Al_2O_3$ to $MgO$ of 3:1.

If the ceramic compositions are those listed in Table II, it is to be noted the aforementioned delay time occurring between step or phase 1 and phase or step 5 of the process varies between 0.5–3 seconds, and 50 blasts of gas pressurized to 300 pounds per square inch produces the yield and fiber texture indicated.

TABLE II

| Composition, Weight percent | | Fusion Temp., °C. | Delay Time, seconds | Blasting Pressure, p.s.i. | Yield grams per 50 blasts |
|---|---|---|---|---|---|
| $SiO_2$ | 36.0 | 1,500 | 3 | 300 | 6.6 |
| $Al_2O_3$ | 48.0 | | | | |
| $MgO$ | 16.0 | | | | |
| $SiO_2$ | 35.5 | 1,450 | 2 | 300 | 5.8 |
| $Al_2O_3$ | 30.5 | | | | |
| $MgO$ | 9.5 | | | | |
| $ZrO_2$ | 24.5 | | | | |
| $SiO_2$ | 50.0 | 1,460 | 3 | 300 | 9.0 |
| $Al_2O_3$ | 22.5 | | | | |
| $MgO$ | 7.5 | | | | |
| $ZrO_2$ | 20.0 | | | | |
| $SiO_2$ | 60.0 | 1,510 | ½ | 300 | 3.6 |
| $Al_2O_3$ | 7.5 | | | | |
| $MgO$ | 2.5 | | | | |
| $ZrO_2$ | 30.0 | | | | |

Synthesizing the ceramic rods is accomplished in the following manner: Chemically pure oxides are accurately weighed and blended in a counter-current batch mixer with water and sufficient organic binder to produce extrusion consistency. Extrusion is performed through a ½ inch diameter vacuum die with the aid of a hydraulic press. The eight-inch-long rods produced are then dried and sintered in air to 1250° C. A sintered rod can then be fiberized using the aforementioned process.

While the inventions have been described herein in what is considered preferred embodiments, it should be recognized departures may be made therefrom within the scope of the inventions, and the inventions should therefore not be limited to the details of the within disclosures, but should be accorded the full scope of the appended claims.

What is claimed is:
1. A method of fiberizing ceramic materials to achieve a relatively high yield of fibers comprising:
   (a) heating one end of an elongated ceramic rod until a relatively uniform homogeneous molten droplet forms on the heated end thereof;
   (b) moving said rod from the heat zone to a position proximate to annular ring nozzle;
   (c) moving said rod and ring nozzle relative to each other whereby the ring nozzle surrounds the molten droplet portion of the ceramic rod; and
   (d) fiberizing the droplet with inclined downwardly directed jets of pressurized gas.

2. A method of fiberizing ceramic materials according to claim 1 wherein said ceramic rod, in step (a) is rotated about the longitudinal axis while being heated to achieve obtaining a relatively uniform homogeneous molten droplet.

3. A method of fiberizing ceramic materials according to claim 1 wherein the apex of the gas jets form a substantially acute angle with the longitudinal axis of said ceramic rod, the acute angle being between about 25° and 50°.

4. A method of fiberizing ceramic materials according to claim 1 wherein said gas in step (d) is pressurized between approximately 250 and 350 pounds per square inch.

5. A method of fiberizing ceramic materials to achieve a relatively high yield of fibers comprising:
   (a) rotating a vertically held elongated ceramic rod in a heat zone until a relatively uniform homogeneous molten droplet forms on the lower end thereof;
   (b) moving said rod from the heat zone to a position proximate to an annular ring nozzle where rotation of the rod ceases;
   (c) moving said rod and ring nozzle relative to each other whereby the ring nozzle surrounds the molten droplet portion of the ceramic rod; and
   (d) fiberizing the droplet with inclined downwardly directed jets of pressurized gas, there being a lag time from achieving the molten droplet of step (a) to fiberizing the droplet of step (d) between about 0–5 seconds to achieve optimum viscosity of the droplet to obtain the maximum fiber yield.

References Cited

UNITED STATES PATENTS

| | | | |
|---|---|---|---|
| 2,133,236 | 10/1938 | Slayter et al. | 65—1 XR |
| 2,175,224 | 10/1939 | Slayter | 65—16 XR |
| 2,822,579 | 2/1958 | Silverman | 65—7 |
| 2,881,471 | 4/1959 | Snow et al. | 65—9 XR |
| 2,916,773 | 12/1959 | Vonnegut. | |
| 2,984,868 | 3/1961 | Hill | 65—7 |
| 2,987,733 | 6/1963 | Stalego | 65—7 XR |
| 3,099,548 | 7/1963 | Ducati | 65—16 XR |

FOREIGN PATENTS 180,739  1/1955  Germany.

DONALL H. SYLVESTER, *Primary Examiner.*

R. LINDSAY, *Assistant Examiner.*